United States Patent [19]

Komiya et al.

[11] Patent Number: 5,290,905
[45] Date of Patent: Mar. 1, 1994

[54] POLYURETHANE, ELASTIC POLYURETHANE FIBER AND POLYESTERPOLYCARBONATEDIOL USED FOR THE SAME

[75] Inventors: Yukiatsu Komiya; Setuo Yamashita; Koji Hirai, all of Kurashiki, Japan

[73] Assignee: Kuraray Co., Ltd., Kurashiki, Japan

[21] Appl. No.: 666,644

[22] Filed: Mar. 8, 1991

[30] Foreign Application Priority Data

| Mar. 13, 1990 | [JP] | Japan | 2-63374 |
| Mar. 13, 1990 | [JP] | Japan | 2-63375 |
| Mar. 13, 1990 | [JP] | Japan | 2-211137 |

[51] Int. Cl.⁵ ............... C08G 18/42; C08G 18/44
[52] U.S. Cl. .................... 528/80; 528/83; 528/84; 428/902
[58] Field of Search ............... 528/80, 83, 84; 428/902

[56] References Cited

U.S. PATENT DOCUMENTS

| 3,379,693 | 4/1968 | Hostettler et al. | 528/80 |
| 3,509,233 | 4/1970 | Muller et al. | 528/84 |
| 3,541,183 | 11/1970 | Kallert et al. | 528/80 |
| 3,547,889 | 12/1970 | Schütze et al. | 528/83 |
| 3,758,443 | 9/1973 | Konig et al. | 528/80 |
| 4,267,120 | 5/1981 | Cuscurida et al. | 528/80 |
| 4,338,422 | 7/1982 | Jackson, Jr. et al. | 528/80 |
| 4,816,529 | 3/1989 | Harris | 528/80 |
| 5,070,172 | 12/1991 | Hirai et al. | 528/80 |
| 5,071,923 | 12/1991 | Hassel et al. | 525/426 |
| 5,084,528 | 1/1992 | Harris | 528/80 |
| 5,116,929 | 5/1992 | Greco et al. | 528/83 |
| 5,118,780 | 6/1992 | Hirai et al. | 528/83 |

FOREIGN PATENT DOCUMENTS

| 0138227 | 4/1985 | European Pat. Off. . |
| 2352627 | 4/1974 | Fed. Rep. of Germany . |
| 3718896 | 12/1962 | Japan . |
| 713 | 11/1971 | Japan . |
| 101496 | 12/1973 | Japan . |
| 173117 | 9/1985 | Japan . |
| 22817 | 1/1987 | Japan . |
| 97617 | 4/1988 | Japan . |
| 132858 | 5/1989 | Japan . |
| 190717 | 6/1989 | Japan . |
| 33382 | 2/1990 | Japan . |
| 33384 | 2/1990 | Japan . |
| 2042623 | 2/1990 | Japan . |

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

The present invention is directed to an elastic polyurethane obtained by copolymerization of a polymer diol of a polyesterpolycarbonate diol utilizing a long-chain diol having methyl branches or a mixed diol of a polyester diol and a polycarbonate diol, with an organic diisocyanate and a chain extender. Elastic fibers obtained by spinning said polyurethane have low tensile stress at low tensile strain zone and high tensile stress at high tensile strain zone.

13 Claims, 2 Drawing Sheets

POLYURETHANE, ELASTIC POLYURETHANE FIBER AND POLYESTERPOLYCARBONATEDIOL USED FOR THE SAME

BACKGROUND OF THE INVENTION

1. Field of the Invention

The present invention relates to a novel polyurethane and elastic polyurethane fiber and a polyesterpolycarbonate diol used for the same.

2. Description of the Related Art

Known polyurethanes are polyester-, polyether- and polycarbonate-based ones. Japanese Patent Application Laid-open Nos. 101496/1973 and 22817/1987 disclose a polyurethane derived from 3-methyl-1,5-pentanediol and a dicarboxylic acid and one from a polyester diol or polycarbonate diol obtained from 2-methyl-1,8-octanediol, respectively.

Japanese Patent Application Laid-open No. 33382/1990 discloses a polyester diol utilizing 2-methyl-1,8-octanediol and a polycarbonate diol utilizing 2-methyl-1,8-octanediol or 3-methyl-1,5-pentanediol and also a polyurethane utilizing a mixture of the polyester diol and the polycarbonate diol as a starting material polymer diol. This polyurethane however cannot be formed into an elastic fiber exhibiting good elastic recovery characteristics at low temperatures.

Japanese Patent Application Laid-open No. 173117/1985 discloses an elastic fiber obtained from a polyurethane utilizing a polyester diol from hexamethylene glycol or 1,10-decanediol. This fiber, utilizing this long-chain diol having no branches, does not have sufficient elastic recovery property.

Japanese Patent Application Laid-open No. 713/1972, U.S. Pat. No. 3,097,192 and Japanese Patent Application Laid-open No. 97617/1988 disclose an elastic fiber of a polyurethane utilizing a polyester diol derived from 2,2,4- or 2,4,4-trimethylhexanediol and adipic acid, one of a polyurethane utilizing a polyester diol from 2,5-hexanediol or 2,2-dimethyl-1,3-propanediol and one of a polyurethane utilizing a polyester diol from (2,2-dimethyl-1,3-propane dodecanedioate) glycol, respectively. The use of these polyesterdiols however fail in providing the obtained fibers with high thermal resistance, elastic recovery and resistance to cold.

Japanese Patent Application Laid-open No. 190717/1989 discloses an elastic fiber of a polyurethane utilizing a polycarbonate diol from 1,6-hexanediol or 1,5-pentanediol. This fiber however is not satisfactory in the elongation.

Japanese Patent Application Laid-open No. 132858/1989 discloses a melt-blown nonwoven fabric of a polyurethane utilizing a polyester diol from 3-methyl-1,5-penetanediol.

An object of the present invention is to provide an elastic polyurethane fiber being excellent in all of resistance to chlorine, water and mildew, thermal resistance and resistance to cold, as well as having high elongation.

Another object of the present invention is to provide an elastic polyurethane fiber having low tensile stress in the low tensile strain region and high tensile stress in the high tensile strain region.

SUMMARY OF THE INVENTION

The present invention provides a polyurethane obtained by copolymerizing a polymer diol, an organic diisocyanate and a chain extender, said polyurethane having an inherent viscosity of 0.2 to 1.6 dl/g and being derived from a polyesterpolycarbonate diol $\alpha$, a mixed polymer diol $\delta$ comprising a polyester diol $\beta$ and a polycarbonate diol $\gamma$ in a weight ratio between $\beta$ and $\gamma$, $\beta/\gamma$, of 10/90 to 80/20, or a mixture comprising the polyesterpolycarbonate diol $\alpha$ and the mixed polymer diol $\delta$ ; where: $\alpha$ is a polyesterpolycarbonate diol comprising the following structural units (I), (II) and (III) and, if necessary, (IV) with a molar ratio of (I)/(II) of 90/10 to 20/80 and having a number average molecular weight of 1,000 to 3,500

wherein $R^1$ represents a divalent organic group,

wherein m and n are each 0 or an integer of 1 to 8 and the sum of m and n is an integer of 4 to 8,

wherein p represents an integer of 6 to 10;

$\beta$ is a polyester diol comprising repeating units represented by

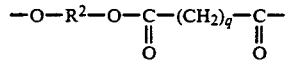

wherein $R^2$ represents one member selected from divalent organic groups, at least 50 mol % of which is

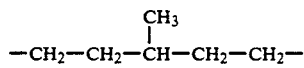

and q represents an integer of 4 to 10, satisfying the following conditions (s) and (t)

$$4 \leq \frac{\text{total number of carbon atoms}}{\text{number of ester groups}} \leq 11 \quad (s)$$

$$0.03 \leq \frac{\text{number of methyne groups}}{\text{total number of carbon atoms}} \leq 0.2 \quad (t)$$

wherein "total number of carbon atoms" means the total number of carbon atoms contained in the polyester diol and excluding those contained in the ester bonds thereof, and having a number average molecular weight of 1,000 to 3,500; and $\gamma$ is a polycarbonate diol comprising repeating units of at least one member selected from the following structural units (V), (VI) and (VII), said repeating units being linked with each other via carbonate bond,

wherein r represents an integer of 6 to 10,

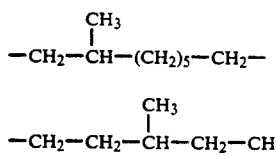  (VI)

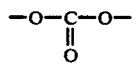  (VII)

the molar ratio of [(VI)+(VII)]/[(V)+(VI)+(VII)] being 0.1 to 1.0, and that of [(V)+(VI)]/[(V)+(VI)+(VII)] being also 0.1 to 1.0, and having a number average molecular weight of 1,000 to 3,000.

The basic finding on which the present invention is based is that the use of polyurethanes utilizing as a polymer diol the above polyesterpolycarbonate diol α and/or the above mixed polymer diol of the polyester diol β and polycarbonate diol γ provides elastic fibers having low tensile stress in the low tensile strain region and high tensile stress in the high tensile strain region.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
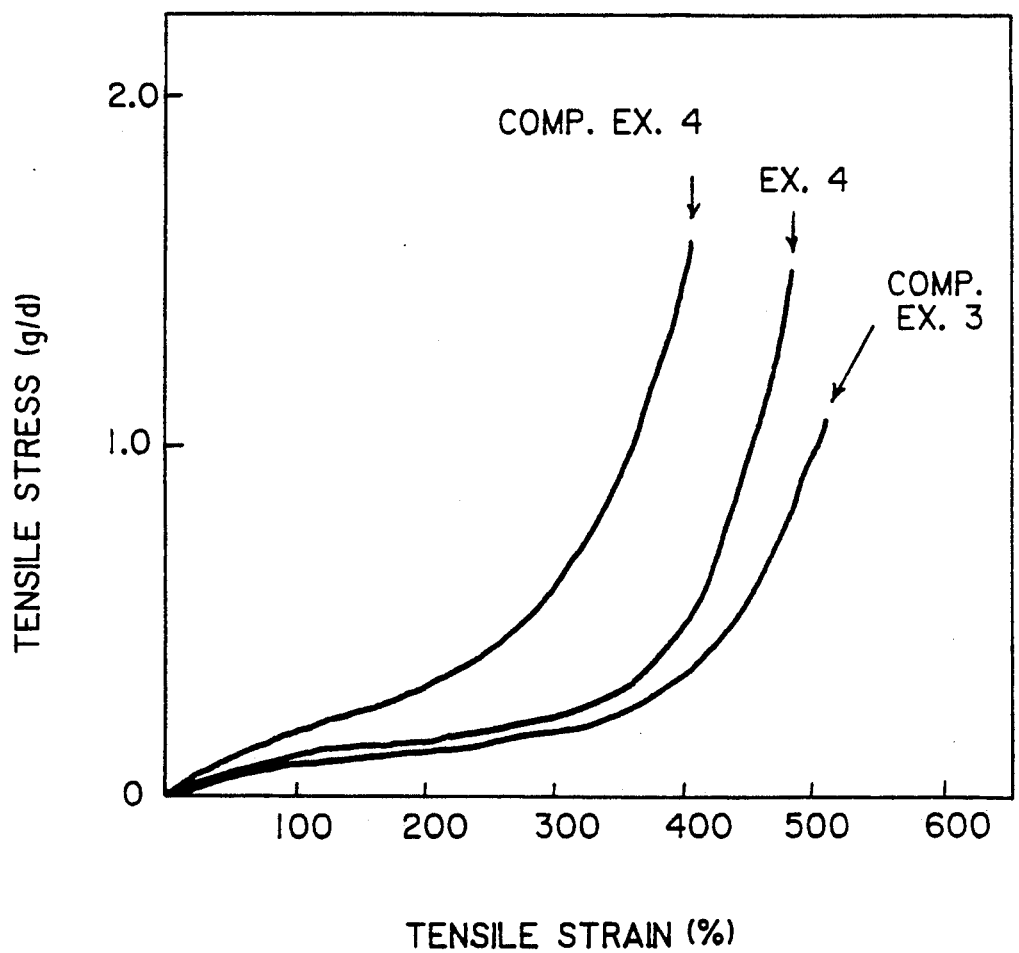
FIG. 1 shows the relationship between the tensile stress and strain of the elastic fiber of the present invention of Example 4, which utilized a polymer diol of the polyesterpolycarbonate diol α of the present invention, that of the elastic fiber of a polyurethane from a polyester diol and obtained in Comparative Example 3 and that of the fiber of a polyurethane from a polycarbonate diol and obtained in Comparative Example 4, respectively.

The feature of the elastic fiber of the present invention lies in the polymer diol residue, i.e. soft segment, of the polyurethane constituting it.

The present invention utilizes as a starting material polymer diol a polyesterpolycarbonate diol α which is described below α and/or a mixture of a polyester diol β and a polycarbonate diol γ in a weight ratio, β/γ, of 10/90 to 80/20, which two are to be described later herein.

α is a polyesterpolycarbonate diol comprising the following structural units (I), (II) and (III) and, if necessary, (IV) with a molar ratio of (I)/(II) of 90/10 to 20/80 and having a number average molecular weight of 1,000 to 3,500

$$-O-\underset{\underset{O}{\|}}{C}-O-$$ (I)

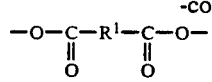 (II)

wherein $R_1$ represents a divalent organic group,

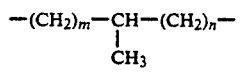 (III)

wherein m and n are each 0 or an integer of 1 to 8 and the sum of m and n is an integer of 4 to 8,

 (IV)

wherein p represents an integer of 6 to 10.

The polyesterpolycarbonate diol, which also constitutes the present invention, is a polymer diol comprising a diol residue, i.e. the group remaining after the 2 terminal OH groups have been removed from the diol, of at least one member selected from the group of the divalent groups represented by formula (III) and if necessary at least one member selected from the group of divalent groups represented by formula (IV). The ends of the structural unit (III) or (IV) are bonded to the structural unit (I) or (II). Preferred examples of compounds giving the unit represented by (III) are primary diols, e.g. 2-methyl-1,8-octanediol and 3-methyl-1,5-pentanediol. Examples of desirable compounds that give the unit represented by (IV) are 1,6-hexanediol, 1,7-heptanediol, 1,8-octanediol, 1,9-nonanediol and 1,10-decanediol, among which preferred is 1,9-nonanediol.

It is preferred that the molar ratio of (III)/[(III)+(IV)] in the polyesterpolycarbonate diol of the present invention be 0.1 to 1.0. If (III)/[(III)+(IV)] is less than 0.1, the polyurethane fiber utilizing this diol will sometimes have low elastic recovery and low elongation.

It is preferred that the dicarboxylic acid that provides the structural unit (II) used for the preparation of the polyesterpolycarbonate diol of the present invention be an aliphatic dicarboxylic acid having 5 to 12 carbon atoms or an aromatic dicarboxylic acid having 8 to 12 carbon atoms, of which the former is preferred. Examples of the aliphatic dicarboxylic acid are glutaric acid, adipic acid, pimelic acid, suberic acid, azelaic acid and sebacic acid. Examples of the aromatic dicarboxylic acid are phthalic acid, terephthalic acid and isophthalic acid. Particularly preferred among the above examples are adipic acid and azelaic acid.

The polyesterpolycarbonate diol α of the present invention has a number average molecular weight of 1,000 to 3,500, preferably 1,500 to 3,000. The thermal resistance and elastic recovery of the resultant polyurethane decrease with a number average molecular weight of less than 1,000, while the spinnability decreases with that exceeding 3,500.

The polyesterpolycarbonate diol α of the present invention comprises the afore-described repeating units (I) and (II) in a molar ratio of (I)/(II) of 90/10 to 20/80, preferably 85/15 to 40/60. The elongation of the fiber obtained from the resultant polyurethane decreases with a (I)/(II) ratio exceeding 90 mol %, while the resistance to hot water decreases with that of less than 20 mol %.

The polyesterpolycarbonate diol α may contain small amounts of structural units other than the above (III)

and (IV), and may also used in combination with other polymer diols within a limit not to substantially impair the effect of the present invention.

Desirable carbonates used for producing the polyester-polycarbonate diol of the present invention are dialkyl carbonates, diaryl carbonates and alkylene carbonates.

The polyesterpolycarbonate diol of the present invention can be produced by any process. For example there can be employed known process which comprises feeding at the same time a diol, a dicarboxylic acid and a carbonate and effecting esterification or transesterification. It is also possible to synthesize a polyester diol or polycarbonate diol beforehand, and reacting it with a carbonate or a diol and dicarboxylic acid, respectively.

The mixed polymer diol used in the present invention is now described.

The mixed polymer diol is a mixture of the polyester diol $\beta$ and polycarbonate diol $\gamma$ described below. The mixing ratio by weight between $\beta$ and $\gamma$, $\beta/\gamma$, is 10/90 to 80/20. The elongation of the resultant fiber decreases with $\beta$ of less than 10% by weight, while the resistance to hot water decreases with $\gamma$ of less than 20% by weight.

Other polymer diol may be used in combination with this mixed polymer diol within a limit not to substantially decrease the effect of the present invention.

$\beta$ is a polyester diol comprising repeating units represented by $$-O-R^2-O-\underset{\underset{O}{\|}}{C}-(CH_2)_q-\underset{\underset{O}{\|}}{C}-$$

wherein $R^2$ represents one member selected from divalent organic groups, at least 50 mol % of which is $$-CH_2-CH_2-\underset{\underset{CH_3}{|}}{CH}-CH_2-CH_2-$$

and q represents an integer of 4 to 10; satisfying the following conditions (s) and (t)

$$4 \leq \frac{\text{total number of carbon atoms}}{\text{number of ester groups}} \leq 11 \quad (s)$$

$$0.03 \leq \frac{\text{number of methyne groups}}{\text{total number of carbon atoms}} \leq 0.2 \quad (t)$$

wherein "total number of carbon atoms" means the total number of carbon atoms contained in the polyester diol and excluding those contained in the ester bonds thereof, and having a number average molecular weight of 1,000 to 3,500.

The polyester diol $\beta$ can be obtained from a diol component comprising at least 50 mol % of 3-methyl-1,5-pentanediol and, as a dicarboxylic acid component, an aliphatic dicarboxylic acid having 4 to 10 methylene chains, e.g. adipic acid, pimelic acid, suberic acid, azelaic acid, sebacic acid and 1,10-decanedicarboxylic acid. In any case the combination of the diol and dicarboxylic acid used must satisfy the condition of $4 \geq$ (total number of carbon atoms)/(number of ester groups)$\geq 11$. With the above ratio being less than 4, the resistance to hot water and cold resistance significantly decrease, while with the ratio exceeding 11 the elastic recovery property decreases to a large extent and the cold resistance and elongation decrease. It is further important that:

$$0.03 \leq \frac{\text{number of methyne groups}}{\text{total number of carbon atoms}} \leq 0.2.$$

The methyne group herein means a group $$"-\underset{|}{C}H-"$$

bonded to 3 different carbon atoms. If the above ratio is less than 0.03, the elastic recovery will, in particular at low temperatures, be poor. On the other hand if it is more than 0.2, the thermal resistance, strength and elastic recovery will become poor. Preferred dicarboxylic acids in view of overall performance are azelaic acid, sebacic acid and 1,10-decanedicarboxylic acid, among which azelaic acid and sebacic acid are more preferred where the product elastic fiber is produced by melt spinning.

If the content of 3-methyl-1,5-pentanediol in the diol component is less than 50 mol %, both the elastic recovery at low temperatures and elongation of the obtained fiber will be low. Examples of other diols that can be used in combination with 3-methyl-1,5-pentanediol include, among others, 1,10-decanediol, 1,9-nonanediol, 1,8-octanediol, 1,6-hexanediol, 1,5-pentanediol and 1,4-butanediol.

The molecular weight of the polyester diol has a large effect on the properties of the obtained fiber and the number average molecular weight must be 1,000 to 3,500, preferably 1,500 to 2,500. A number average molecular weight of smaller than 1,000 decreases the thermal resistance, elastic recovery at low temperatures and elongation of the resultant fiber. On the other hand, that of larger than 3,500 decreases the elastic recovery property and, where melt spinning is employed, generates soilings on the spinneret, clogging of the filter and like troubles, whereby continuous spinning operation is difficult to conduct over a long period.

The polyester diol used in the present invention can be produced by any process including the known one for producing polyethylene terephthalate or polybutylene terephthalate, i.e. transesterification or direct esterification, followed by melt polycondensation.

The polycarbonate diol $\gamma$ comprises repeating units of the following formula (VI) or at least two members selected from the following structural units (V), (VI) and (VII), said units being linked with each other via carbonate bond, $$-(CH_2)_r- \qquad (V)$$

wherein r represents an integer of 6 to 10

$$-CH_2-\underset{\underset{CH_3}{|}}{CH}-(CH_2)_5-CH_2- \qquad (VI)$$

$$-CH_2-CH_2-\underset{\underset{CH_3}{|}}{CH}-CH_2-CH_2- \qquad (VII)$$

the molar ratio of [(VI)+(VII)]/[(V)+(VI)+(VII)] being 0.1 to 1.0, and that of [(V)+(VI)]/[(V)+(VI)+(VII)] being also 0.1 to 1.0, and having a number average molecular weight of 1,000 to 3,000.

The polycarbonate diol used in the present invention comprises at least one member selected from the above structural units (V), (VI) and (VII). Examples of compounds that provide the groups represented by formula (V) are 1,6-hexanediol, 1,7-heptanediol, 1,8-octanediol, 1,9-nonanediol and 1,10-decanediol, among which preferred is 1,9-nonanediol.

Examples of compounds that can provide groups represented by (VI) and (VII) are 2-methyl-1,8-octanediol and 3-methyl-1,5-pentanediol, respectively. In the polycarbonate diol γ, the ratios of [(VI)+(VII)]/[(V)+(VI)+(VII)] and [(V)+(VI)]/[(V)+(VI)+(VII)] are both 0.1 to 1.0, both preferably at least 0.3. With the ratio [(VI)+(VII)]/[(V)+(VI)+(VII)] being less than 0.1, the elastic recovery and elongation of the obtained fiber decrease, and with a ratio [(V)+(VI)]/[(V)+(VI)+(VII)] of less than 0.1 the resistance to water, mildew and cold decreases.

The number average molecular weight of the polycarbonate diol has a large influence on the properties and is 1,000 to 3,000. If the molecular weight is smaller than 1,000, the resultant fiber will have low elastic recovery property, resistance to cold and elongation as well as low thermal resistance. On the other hand, if the molecular weight is larger than 3,000, not only the resultant fiber will have low elastic recovery, but the spinnability will become poor with ready occurrence of spinneret soiling, filter clogging and the like, thereby shortening the continuous spinning operation time.

In the preparation of the polycarbonate diol, small amounts of diols other than the above starting material diol may be used in combination with the principal diol.

Preferred examples of carbonates usable for the polycarbonate diol used in the present invention are dialkyl carbonate, diaryl carbonate and alkylene carbonate.

The polycarbonate diol used in the present invention can be produced by any process including the known one for producing polycarbonates from diphenyl carbonate and bisphenol A, i.e. transesterification.

Examples of diisocyanates suitably used in the present invention are aliphatic, alicyclic and aromatic diisocyanates, preferably those having a molecular weight of not more than 500, e.g. 4,4'-diphenylmethane diisocyanate, p-phenylene diisocyanate, tolylene diisocyanate, 1,5-naphthylene diisocyanate, xylylene diisocyanate, hexamethylene diisocyanate, isophorone diisocyanate, and 4,4'-dicyclohexylmethane diisocyanate, among which particularly preferred is 4,4'-diphenylmethane diisocyanate.

Known chain extenders in the art are usable for the synthesis of the polyurethane of the present invention in the art, i.e. low-molecular-weight compounds having a molecular weight of not more than 400 and having at least 2 hydrogen atoms reactable with isocyanate, for example diols, e.g. ethylene glycol, propylene glycol, 1,4-butanediol, 1,6-hexanediol, 3-methyl-1,5-pentanediol, 1,4-bis(2-hydroxyethoxy)benzene, 1,4-cyclohexanediol, bis(β-hydroxyethyl) terephthalate and xylylene glycol; and diamines, e.g. ethylenediamine, propylenediamine, isophoronediamine, hydrazine, 4,4'-diaminodiphenylmethane, 4,4'-diaminodicyclohexylmethane, dihydrazide, piperadine and xylylenediamine.

These compounds may be used singly or in combination. The most preferred chain extenders are 1,4-butanediol and 1,4-bis(2-hydroxyethoxy)benzene.

Where the elastic fiber is produced from a thermoplastic polyurethane by, in particular, melt spinning, the proper selection of 4,4-diphenylmethane diisocyanate as the organic diisocyanate used for the synthesis of the thermoplastic polyurethane, in combination with 1,4-butanediol and/or 1,4-bis(2-hydroxyethoxy)benzene as the chain extender will provide a fiber having excellent heat resistance, elastic recovery and elongation.

The polyurethane of the present invention can be produced by known processes for urethanization, among which preferred is, according to a study by the present inventors, melt polymerization in the substantial absence of inert solvent, in particular continuous melt polymerization through a multi-screw extruder.

The melt polymerization is conducted preferably, although not specifically restricted, at a temperature of 200° to 240° C. A temperature below 240° C. can increase the thermal resistance, and one above 200° C. can provide a thermoplastic polyurethane having good spinnability.

It is preferred that the polyurethane of the present invention have an inherent viscosity $\eta_{inh}$ of 0.2 to 1.6 dl/g, more preferably 0.3 to 1.4 dl/g. The inherent viscosity, $\eta_{inh}$, herein is determined from the viscosity measured on a 0.5 g/dl solution of specimen in N,N-dimethylformamide containing 1% by weight of n-butylamine, which has been kept standing 24 hours at a room temperature after the dissolution, with Uberohde viscometer. With an $\eta_{inh}$ of less than 0.2 dl/g the elastic recovery is low, while with that exceeding 1.6 dl/g the spinnability becomes poor.

In the production of the polyurethane of the present invention, it is preferred that the polymer diol (X), organic diisocyanate (Y) and chain extender (Z) be used in a molar ratio, (Y)/[(X)+(Z)], of 0.9 to 1.2, more preferably 0.95 to 1.15. This molar ratio range can provide the resultant elastic polyurethane fiber with excellent thermal resistance, elastic recovery and elongation.

It is considered that the polyurethane of the present invention consists substantially of structural units of:

(x) a divalent group comprising a polymer diol with its both terminal hydroxyl groups of which the 2 hydrogen atoms have been removed;

(y) a divalent group derived from an organic diisocyanate and represented by the formula

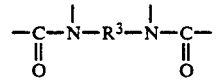

wherein $R^3$ represents a divalent organic group; and (z) a divalent group comprising a low-molecular-weight compound (chain extender) of which the 2 hydrogen atom reactable with isocyanates have been removed.

The polyurethane obtained by this invention will find use as sheet, film, roll, gear, solid tire, belt, hose, tube, vibration isolator, packing, shoe sole (microcellular), artificial leather, fiber treatment, cushioning material, paint, adhesive, sealant, water proofing agent, flooring material, and elastic fiber.

The elastic polyurethane fiber of the present invention is described next.

The polyurethane of the present invention can be formed into fiber by known dry spinning, wet spinning, melt spinning or like processes.

Among the above processes, melt spinning is particularly preferred because of its capability of forming fine filaments. In this case, the polyurethane is pelletized first and the pellets are then melt spun; or, the thermoplastic polyurethane obtained by melt polymerization is directly extruded through spinnerets, the latter process being preferred from the viewpoint of spinning stability.

Further the elastic polyurethane fiber of the present invention can be provided with still higher elastic recovery by spinning the polyurethane with excess isocyanate. The polyurethane with excess isocyanate means that having a molar ratio of (organic diisocyanate Y)/[(polymer diol X)+(chain extender Z)] of 1.02 to 1.15, or a blend having a (Y)/[(X)+(Z)] ratio of 1.02 to 1.15 obtained by addition at the spinning of an amount of polyisocyanate or blocked polyisocyanate to the polyurethane with non-excess isocyanate.

The above highly elastic polyurethane fiber obtained from the polyurethane with excess isocyanate has an amount of allophanate bonds of 0.001 to 0.1 mmol/g-fiber. The amount of allophanate bond is determined by dissolving a specimen fiber in a 0.5N n-butylamine solution in N,N-dimethylformaide, followed by back-titration.

The elastic polyurethane fiber of the present invention may incorporate, besides the above polyurethane, small amounts of other polymers and organic and inorganic additives within limits not to impair the effect of the present invention.

To summarize, the elastic polyurethane fiber of the present invention has excellent resistance to heat, cold and water, and elastic recovery, and high elongation and resistance to chlorine.

The elastic polyurethane fiber thus obtained is used in the actual applications as it is, as core yarns covered with other fibers, or as fabrics in which it is used in combination with other fibers. Examples of other fibers are such known fibers as polyamide fiber, wool, cotton and polyester fiber.

The elastic polyurethane fiber of the present invention can be dyed at a temperature of 120° C. or above, and therefore can be formed into elastic core yarns, fabrics, etc., in combination with polyester fibers, which are generally dyed at temperatures above 120° C.

The elastic core yarns as used herein include those comprising an elastic polyurethane yarn as core covered with other fibers, and are prepared for example by using a twister, by air entanglement or by using a ring frame, although the preparation process is not limited thereto.

The elastic core yarns herein preferably contain the elastic polyurethane fiber of the present invention as the core thereof in a ratio to the other fiber of 1:2 to 1:30.

The term "fabrics" used herein includes woven, knitted and nonwoven fabrics and paper, among which woven and knitted fabrics are preferred by virtue of their capability to give various desired mechanical properties by selecting weaving or knitting conditions.

The elastic polyurethane fiber of the present invention is used in fabrics in combination with other known fibers, e.g. polyester fiber, polyamide fiber, cotton and wool.

The fabrics as referred to in the present invention comprising the elastic polyurethane fiber and other fibers preferably contain at least 30% of the other fibers on their surface (surface yarn). The fabrics have desirable light resistance and usableness when they are so constructed that the elastic polyurethane fiber contained is positioned at the middle part and thus does not expose on the surface to an extent possible.

It is preferred for practical purposes that the elastic polyurethane fiber of the present invention be contained in the fabrics in an amount of at least 3%, or at least 5% where an elastic core yarn containing the elastic polyurethane fiber is used. With the content being less than the above, the fabrics sometimes decrease their elastic performance.

The other fibers constituting the fabrics can be in any form including spun yarns, filament yarns, grey yarns and textured yarns. Preferred polyester fibers for this purpose comprise at least 90 mol % of repeating units from ethylene terephthalate residue.

The fabrics are prepared by known weaving or knitting processes. Examples of knit fabrics are power net, mesh, tulle, satin, tricot lace and jacquard for warp knits and reversible plain stitch, interlock, mock, pile, velour, mesh and jacquard for round knits. Examples of woven fabrics are satin, plain weave, twill and double weave.

The other fibers used in combination with the elastic polyurethane fiber of the present invention may be of common fineness, and is preferably of 0.1 to 10 deniers.

That the fabrics ar dyeable at high temperature and under high pressure means that: after the fabrics have been dyed with a disperse dye or the like used conventionally for dyeing polyester fibers under the high temperature and pressure conditions of 120° C.×60 minutes, the elastic polyurethane fiber contained therein still maintains at least 80% its original strength.

Accordingly, the elastic polyurethane fiber of the present invention can, thanks to its dyeability under conditions of high temperature and pressure, be used in combination with polyester fibers to form fabrics. The polyester fibers used for this purpose preferably have an anti-pilling property of at least grade 3 as determined in accordance with ICI method with a testing time of 5 hours. Polyesters having this property are those comprising, either by copolymerization or by blending, at least one member selected from the group consisting of a phosphorus compound, silica compound, sulfonic acid group-containing compound and like anit-pilling improving compounds. The polyesters thus preferably have copolymerized or contain any one of the above compounds in an amount of 0.05 to 5 mol %. Antipilling property can also be provided by permitting the polyester fibers to have an irregular cross-sectional shape. In this case a flat cross section with a flatness, L/W (L: maximum length and W: maximum breadth of the fiber cross section) is preferably 2 to 10.

The core yarns and fabrics utilizing the elastic polyurethane fiber of the present invention are used for example for the following items:

Clothing: swimwear, skiwear, cycling wear, leotards, lingerie, foundation garments, underwear, denims and polo shirts.

Clothing-miscellaneous: panty-hose, stockings, socks, supporters, caps, gloves, power net and bandage.

Non-clothing: gut for tennis racket, seaming thread for integrally molded car seat and metal-covered yarn for robot arm.

Other features of the invention will become apparent in the course of the following descriptions of exemplary embodiments Which are given for illustration of the invention and are not intended to be limiting thereof.

In the Examples various measurements were done according to the following methods.

HOT WATER RESISTANCE IN TERMS OF STRENGTH RETENTION

The tensile strength retention of a specimen having been treated in hot water at 130° C. for 90 minutes is determined.

ELASTIC RECOVERY PROPERTY

The elastic recovery of a specimen elongated by 200% and kept at that state for 3 minutes at −10° C. and that at 20° C. are determined.

TENSILE STRENGTH AND ELONGATION

JIS L-1013 is applied.

INHERENT VISCOSITY ($\eta_{inh}$)

This is determined from the viscosity measured on a 0.5 g/dl solution of specimen in N,N-dimethylformamide containing 1% by weight of n-butylamine, which has been kept standing 24 hours at a room temperature after the dissolution, with Uberohde viscometer.

EXAMPLES

The compounds used in Examples are shown by abbreviations shown in Table 1.

TABLE 1

| Abbr. | Compound |
|---|---|
| ND | 1,9-nonanediol |
| MOD | 2-methyl-1,8-octanediol |
| MPD | 3-methyl-1,5-pentanediol |
| NPG | neopentyl glycol |
| BD | 1,4-butanediol |
| HD | 1,6-hexanediol |
| AD | adipic acid |
| AZ | azelaic acid |
| SA | sebacic acid |
| DA | 1,10-decanedicarboxylic acid |
| MDI | 4,4'-diphenylmethane diisocyanate |
| BHEB | 1,4-bis(2-hydroxyethoxy)benzene |
| DPC | diphenyl carbonate |
| EC | ethylene carbonate |

REFERENCE EXAMPLE 1

Preparation of Polyesterpolycarbonate Diol

A mixture comprising 833 g of a mixture of 3-methyl-1,5-pentanediol (MPD) and 1,6-hexanediol (HD) (MPD/HD molar ratio: 80:20), 697 g of 1,10-decanedicarboxylic acid (DA) and 267 g of ethylene carbonate (EC) was heated up to 160° C. in nitrogen gas flow to distill off ethylene glycol (EG) and water. After almost all EG and water have been distilled off, the reaction system was evacuated and condensation was allowed to further proceed under a vacuum of 2 to 10 mmHg. As a result, a polyesterpolycarbonate diol having a hydroxyl group value of 74.9 and a molecular weight of 1,500 was obtained and named polyesterpolycarbonate diol a.

REFERENCE EXAMPLES 2 THROUGH 11

Reference Example 1 was repeated except for using the diol components, dicarboxylic acid components shown in Table 2 to obtain polyesterpolycarbonates (polyesterpolycarbonates b through k) as shown in Table 2.

REFERENCE EXAMPLE 12

Preparation of Polyester Diol

Esterification was effected with 2,080 g of a mixture of 2-methyl-1,8-octanediol and 1,9-nonanediol (molar ratio: 50:50) and 1,460 g of adipic acid (molar ratio of diols/adipic acid: 1.3/1) in nitrogen gas flow under atmospheric pressure and at about 220° C., while water formed by condensation was being distilled off. When the acid value of the product polyester decreased below 0.3, the reaction was terminated by gradually evacuating the system with a vacuum pump, to obtain a polyester diol having a hydroxyl group value of 74.8 (hereinafter referred to as "Polyester l").

REFERENCE EXAMPLE 13

Preparation of Polycarbonate Diol

A mixture comprising 1,822 g of a mixture of 2-methyl-1,8-octanediol (MOD) and 1,9-nonanediol (ND) (molar ratio: 50:50) and 2,140 g of diphenyl carbonate was heated in nitrogen gas flow at 200° C. while phenol that formed was being distilled off from the reaction system. The temperature was gradually elevated to 210° to 220° C. to distill off most of phenol, and then the system was evacuated to completely distill off phenol under a vacuum of 6 to 10 mmHg at 210° to 220° C. As a result, a polycarbonate diol having a molecular weight of 1,500 was obtained and named Polycarbonate m.

TABLE 2

| | Carbonate | Acid component | Diol component (molar ratio) | Number average molecular weight | (D)/(E) |
|---|---|---|---|---|---|
| Polyesterpolycarbonate | | | | | |
| a | EC | DA | MPD/HD (80/20) | 1500 | 50/50 |
| b | EC | AZ | ND/MPD (40/60) | 1505 | 50/50 |
| c | DPC | SA | ND/MPD (20/80) | 1640 | 30/70 |
| d | DPC | AD | ND/MOD (50/50) | 1490 | 50/50 |
| e | DPC | AD | ND/MOD/MPD (60/20/20) | 1800 | 60/40 |
| f | DPC | SA | MPD | 1800 | 50/50 |
| g | EC | DA | NPG/BD (80/20) | 1500 | 50/50 |
| h | EC | AD | HD | 1500 | 50/50 |
| i | EC | AZ | ND/MPD (5/95) | 1900 | 70/30 |
| j | EC | AZ | HD/MPD (10/90) | 1950 | 80/20 |
| k | DPC | AD | ND/HD/MPD (10/10/80) | 2050 | 75/25 |
| Polyester | | | | | |
| l | — | AD | ND/MOD (50/50) | 1500 | 0/100 |
| Polycarbonate | | | | | |
| m | EC | — | ND/MOD (50/50) | 1500 | 100/0 |

(D) = number of carbonate bonds; (E) = number of ester bonds

EXAMPLE 1

Continuous melt polymerization was conducted by continuously feeding to a same-direction twin-screw extruder, a mixture composed of polyesterpolycarbonate a and BD and heated at 30° C. and MDI melted by heating at 50° C. each with a metering pump at such rates that the ratio of the moles fed of (Polyesterpolycarbonate a)/MDI/BD would be 1/3.15/2. The extruder had 3 independent temperature-controllable zones, and the temperature of its middle zone, i.e. polymerization temperature, was maintained at 230° C. The polyurethane that formed was continuously extruded into water to form strands, which were then cut into pellets through a pelletizer.

The pellets were dried in vacuo at 80° C. for 10 hours, and then spun through a spinning machine equipped with a single-screw extruder at a spinning temperature of 235° C., spinning speed of 800 m/min, apparent draft of 847, speed difference between godet roll and take-up of 35 m/min and spinning tension of 0.08 g/d, to give a polyurethane yarn of 70 deniers/2 filaments. The yarn thus obtained was heat treated at 80° C. for 20 hours and then tested for the desired properties. The results were, as shown in Table 3, favorable.

EXAMPLES 2 THROUGH 9

Polyurethanes having the compositions shown in Table 3 were obtained from Polyesterpolycarbonates b through f and i through k shown in Table 2 in the same manner as in Example 1. The polyurethanes obtained were pelletized and then spun into elastic polyurethane fibers in the same manner as in Example 1. The fibers thus obtained had good properties as shown in Table 3. FIG. 1 shows the stress-strain curve of the fiber obtained in Example 4.

COMPARATIVE EXAMPLES 1 THROUGH 4

Polyurethanes having the compositions shown in Table 3 were obtained from polyesterpolycarbonates g and h, Polyester l and Polycarbonate m shown in Table 2 in the same manner as in Example 1. The polyurethanes obtained were pelletized and then spun into elastic polyurethane fibers in the same manner as in Example 1. None of the fibers thus obtained had good properties in all of tensile behavior, hot water resistance and elastic recovery as shown in Table 3.

below about 1, the reaction was terminated by gradually evacuating the system with a vacuum pump, to obtain a polyester diol having a hydroxyl group value of 44.9 and an acid value of 0.23 (hereinafter referred to as "Polyester n"). This polyester was liquid at room temperature and had a molecular weight of 2,500.

REFERENCE EXAMPLES 15 THROUGH 20

Reference Example 14 was repeated except for using the acid component and diol components shown in Table 4 to obtain polyesterdiols (Polyesters o through t) as shown in Table 4.

REFERENCE EXAMPLE 21

Preparation of Polycarbonate Diol

A mixture comprising 1,762 g of a mixture of 2-methyl-1,8-octanediol (MOD) and 1,9-nonanediol (ND) (molar ratio: 50:50) and 2,140 g of diphenyl carbonate was heated in nitrogen gas flow to 200° C. while phenol that formed was being distilled off from the reaction system. The temperature was gradually elevated to 210° to 220° C. to distill off most of phenol, and then the system was evacuated to completely distill off phenol under a vacuum of 6 to 10 mmHg at 210° to 220° C. As a result, a polycarbonate diol having a molecular weight of 2,000 was obtained and named Polycarbonate u.

REFERENCE EXAMPLES 22 THROUGH 26

Reference Example 21 was repeated except for using

TABLE 3

| | Polymer diol (molar ratio) | Diisocyanate (molar ratio) | Chain extender (molar ratio) | Properties of elastic polyurethane fiber | | | | | | |
|---|---|---|---|---|---|---|---|---|---|---|
| | | | | Strength (g/d) | Elongation (%) | | Elastic recovery (%) | | Hot water resistance (%) | $\eta_{inh}$ (dl/g) |
| | | | | | 25τ | −10τ | 25τ | −10τ | | |
| Example 1 | Polyesterpolycarbonate a (1.0) | MDI (3.15) | BD (2.0) | 1.5 | 480 | 470 | 97 | 97 | 100 | 0.60 |
| Example 2 | Polyesterpolycarbonate b (1.0) | MDI (3.15) | BD (2.0) | 1.6 | 500 | 505 | 97 | 97 | 100 | 0.55 |
| Example 3 | Polyesterpolycarbonate c (1.0) | MDI (3.15) | BD (2.0) | 1.5 | 510 | 450 | 97 | 97 | 97 | 0.50 |
| Example 4 | Polyesterpolycarbonate d (1.0) | MDI (3.05) | BD (2.0) | 1.5 | 480 | 460 | 96 | 96 | 100 | 0.62 |
| Example 5 | Polyesterpolycarbonate e (1.0) | MDI (3.05) | BD/BHEB (1.0/1.0) | 1.6 | 470 | 500 | 98 | 97 | 100 | 0.75 |
| Example 6 | Polyesterpolycarbonate f (1.0) | MDI (3.05) | BD/BHEB (1.0/1.0) | 1.5 | 475 | 485 | 98 | 97 | 100 | 0.76 |
| Example 7 | Polyesterpolycarbonate i (1.0) | MDI (3.12) | BD (2.0) | 1.5 | 480 | 475 | 97 | 97 | 100 | 0.61 |
| Example 8 | Polyesterpolycarbonate j (1.0) | MDI (3.12) | BD (2.0) | 1.5 | 475 | 475 | 97 | 96 | 100 | 0.59 |
| Example 9 | Polyesterpolycarbonate k (1.0) | MDI (3.12) | BD (2.0) | 1.5 | 485 | 480 | 98 | 97 | 100 | 0.60 |
| Comparative Example 1 | Polyesterpolycarbonate g (1.0) | MDI (3.15) | BD (2.0) | 1.4 | 400 | 430 | 90 | 70 | 90 | 0.58 |
| Comparative Example 2 | Polyesterpolycarbonate h (1.0) | MDI (3.15) | BD (2.0) | 1.6 | 480 | 550 | 90 | 30 | 80 | 0.48 |
| Comparative Example 3 | Polyester l (1.0) | MDI (3.15) | BD (2.0) | 1.1 | 500 | 200 | 96 | 40 | 75 | 0.60 |
| Comparative Example 4 | Polycarbonate m (1.0) | MDI (3.15) | BD (2.0) | 1.6 | 400 | 200 | 95 | 50 | 100 | 0.64 |

REFERENCE EXAMPLE 14

Preparation of Polyester Diol

Esterification was effected with 1,534 g of 3-methyl-1,5-pentanediol and 1,880 g of azelaic acid (molar ratio of MPD/AZ: 1.3/1) in nitrogen gas flow under atmospheric pressure and at about 195° C., while water formed by condensation was being distilled off. When the acid value of the resultant polyester decreased the diol components and carbonates shown in Table 5 to obtain polycarbonate diols (polycarbonates v through z) as shown in Table 5.

TABLE 4

| Polymer diol | Acid component (molar ratio) | Diol component (molar ratio) | F | G | Number av. mol. wt. |
|---|---|---|---|---|---|
| Polyester n | AZ | MPD | 6.84 | 0.081 | 2,500 |
| Polyester o | SA | MPD | 7.45 | 0.077 | 2,000 |
| Polyester p | DA/AD (8/2) | MPD | 8.04 | 0.075 | 1,500 |
| Polyester q | AZ | MPD/HD (7/3) | 6.93 | 0.058 | 2,000 |
| Polyester r | AZ/AD (7/3) | MPD/ND (7/3) | 7.00 | 0.057 | 2,000 |
| Polyester s | AD | BD | 4.21 | 0 | 2,000 |
| Polyester t | AD | MOD/ND (5/5) | 7.07 | 0.035 | 2,000 |

Notes:
F = total number of carbon atoms/number of ester bonds
G = number of methyne groups/total number of carbon atoms

TABLE 5

| Polymer diol | Carbonate | Diol component (molar ratio) | Number av. mol. wt. |
|---|---|---|---|
| Polycarbonate u | DPC | ND/MOD (5/5) | 2,000 |
| Polycarbonate v | DPC | ND/MPD (7/3) | 2,005 |
| Polycarbonate w | EC | ND/MOD/MPD (5/3/2) | 2,015 |
| Polycarbonate x | EC | ND/MPD (3/7) | 2,010 |
| Polycarbonate y | EC | HD | 2,005 |
| Polycarbonate z | DPC | ND/MOD (4/6) | 2,000 |

TABLE 6

| | Polymer diol (molar ratio is 1.0) | | | | | Properties of elastic polyurethane fiber | | | | | | |
|---|---|---|---|---|---|---|---|---|---|---|---|---|
| | Polyester (A) | Polycarbonate (B) | A/B weight ratio | Diisocyanate (molar ratio) | Chain extender (molar ratio) | Strength (g/d) | Elongation (%) 25τ | −10τ | Elastic recovery (%) 25τ | −10τ | Hot water resistance (%) | η_inh (dl/g) |
| Example 10 | n | u | 50/50 | MDI (3.15) | BD (2.0) | 1.5 | 480 | 470 | 97 | 96 | 99 | 0.58 |
| Example 11 | o | v | 60/40 | MDI (3.15) | BD (2.0) | 1.5 | 510 | 505 | 97 | 97 | 98 | 0.52 |
| Example 12 | p | u | 40/60 | MDI (3.15) | BD (2.0) | 1.6 | 470 | 450 | 98 | 96 | 100 | 0.61 |
| Example 13 | q | w | 50/50 | MDI (3.05) | BD/BHEB (1.0/1.0) | 1.7 | 470 | 460 | 98 | 96 | 100 | 0.71 |
| Example 14 | r | u | 50/50 | MDI (3.15) | BD (2.0) | 1.5 | 500 | 500 | 97 | 97 | 99 | 0.49 |
| Example 15 | r | x | 60/40 | MDI (3.15) | BD (2.0) | 1.5 | 460 | 450 | 97 | 95 | 99 | 0.51 |
| Comparative Example 5 | n | — | 100/0 | MDI (3.15) | BD (2.0) | 1.1 | 500 | 525 | 95 | 96 | 80 | 0.59 |
| Comparative Example 6 | — | u | 0/100 | MDI (3.15) | BD (2.0) | 1.5 | 400 | 200 | 97 | 56 | 100 | 0.51 |
| Comparative Example 7 | s | y | 50/50 | MDI (3.15) | BD (2.0) | 1.4 | 430 | 250 | 90 | 60 | 84 | 0.60 |
| Comparative Example 8 | t | z | 50/50 | MDI (3.15) | BD (2.0) | 1.4 | 500 | 300 | 96 | 65 | 99 | 0.50 |

EXAMPLE 10

Continuous melt polymerization was conducted by continuously feeding to a same-direction twin-screw extruder, a mixture composed of a mixture of Polyester n and Polycarbonate u (weight ratio of Polyester n/Polycarbonate u: 50/50) and BD and heated at 30° C. and MDI melted by heating at 50° C. each with a metering pump at such rates that the moles used of (polymer diol)/MDI/BD would be 1/3.15/2. The extruder had 3 independent temperature-controllable zones, and the temperature of its middle zone, i.e. polymerization temperature, was maintained at 230° C. The polyurethane that formed was continuously extruded into water to form strands, which were then formed into pellets through a pelletizer.

Figure 2:
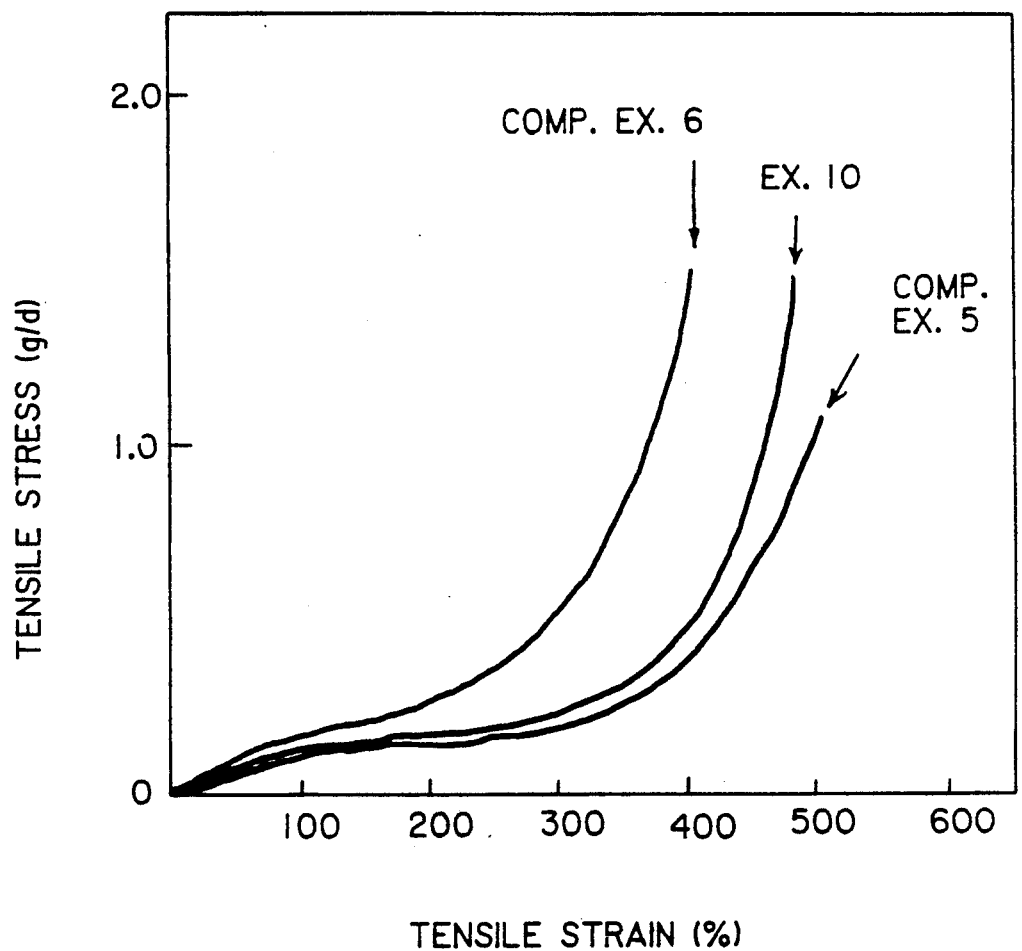
FIG. 2 shows the relationship between the tensile stress and strain of the elastic fiber of the present invention, utilizing a polymer diol of the mixture of the polyester diol β and polycarbonate diol γ and obtained in Example 10, that of the elastic fiber of a polyurethane from a polyester diol and obtained in Comparative Example 5 and that of the fiber of a polyurethane from a polycarbonate diol and obtained in Comparative Example 6.

The pellets were dried in vacuo at 80° C. for 10 hours, and then spun through a spinning machine equipped with single-screw extruder at a spinning temperature of 235° C., spinning speed of 800 m/min, apparent draft of 847, speed difference between godet roll and take-up of 35 m/min and spinning tension of 0.08 g/d, to give a polyurethane yarn of 70 deniers/2 filaments. The yarn thus obtained was heat treated at 80° C. for 20 hours and then tested for the desired properties. The results were, as shown in Table 6 and FIG. 2, favorable.

EXAMPLES 11 THROUGH 15

Polyurethanes having the compositions shown in Table 6 were obtained, pelletized and then spun into elastic polyurethane fibers in the same manner as in Example 10. The fibers thus obtained had good properties as shown in Table 6.

COMPARATIVE EXAMPLES 5 THROUGH 8

Polyurethanes having the compositions shown in Table 6 were obtained, pelletized and then spun into elastic polyurethane fibers in the same manner as in Example 10. None of the fibers thus obtained had good properties in all of tensile behavior, hot water resistance and elastic recovery as shown in Table 6.

EXAMPLE 16

Example 10 was repeated except for using a polymer diol obtained by mixing Polyester l, Polycarbonate m and Polyesterpolycarbonate i in a ratio of 1/1/3 and employing a (polymer diol)/MDI/BD molar ratio of 1/3.12/2, to obtain a polyurethane fiber. The fiber thus obtained showed a tensile strength of 1.6 g/d, elongations of 470% at 25° C. and 470% at −10° C., elastic recovery of 97% at 25° C. and hot water resistance of 99%, which were good.

Obviously, numerous modifications and variations of the present invention are possible in light of the above teachings. It is therefore to be understood that within the scope of the appended claims, the invention may be practiced otherwise than as specifically described herein.

What is claimed is:

1. A polyurethane obtained by copolymerizing a polymer diol, an organic diisocyanate and a chain extender, said polyurethane having an inherent viscosity of 0.2 to 1.6 dl/g and being derived from a polyesterpolycarbonate diol α, a mixed polymer diol δ comprising a polyester diol β and a polycarbonate diol γ in a weight ratio between β and γ, β/γ, of 10/90 to 80/20, or a mixture comprising the polyesterpolycarbonate diol α and the mixed polymer diol δ; where:

α is a polyesterpolycarbonate diol comprising the following structural units (I), (II) and (III) with a molar ratio of (I)/(II) of 90/10 to 20/80 and having a number average molecular weight of 1,000 to 3,500

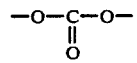 (I)

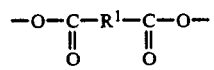 (II)

wherein $R^1$ represents a divalent organic group,

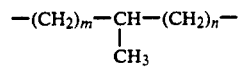 (III)

wherein m and n are each 0 or an integer of 1 to 8 and the sum of m and n is an integer of 4 to 8;

β is a polyester diol comprising repeating units represented by

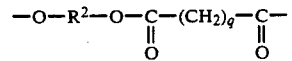

wherein $R^2$ represents one member selected from divalent organic groups, at least 50 mol % of which is

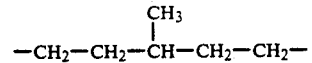

and q represents an integer of 4 to 10, satisfying the following conditions (s) and (t)

$$4 \leq \frac{\text{total number of carbon atoms}}{\text{number of ester groups}} \leq 11 \quad (s)$$

$$0.03 \leq \frac{\text{number of methyne groups}}{\text{total number of carbon atoms}} \leq 0.2 \quad (t)$$

wherein "total number of carbon atoms" means the total number of carbon atoms contained in the polymer diol and excluding those contained in the ester bonds thereof, and having a number average molecular weight of 1,000 to 3,500; and γ is a polycarbonate diol comprising repeating units selected from the group consisting of structural units (V)+(VI), structural units (V)+(VII), structural units (V)+(VI)+(VII), structural units (VI)+(VII), and structural units (VI), said repeating units being linked with each other via carbonate bond,

 (V)

wherein r represents an integer of 6 to 10,

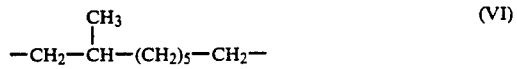 (VI)

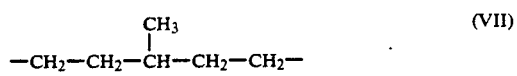 (VII)

the molar ratio of [(VI)+(VII)]/[(V)+(VI)+(VIII)] being 0.1 to 1.0, and that of [(V)+(VI)]/[(V)+(VI)+(VII)] being also 0.1 to 1.0, and having a number average molecular weight of 1,000 to 3,000.

2. A polyurethane according to claim 1, said polyurethane has an amount of allophanate bonds of 0.001 to 0.1 mmol/g.

3. A polyurethane according to claim 1, wherein the structural unit (III) of said polyesterpolycarbonate diol α is

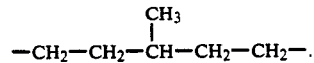

4. A polyurethane according to claim 1, wherein the structural unit (III) of said polyesterpolycarbonate diol α is

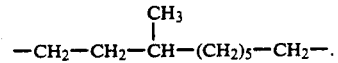

5. A polyurethane according to claim 1, wherein the structural unit (II) of said polyesterpolycarbonate diol α is a divalent organic group having 3 to 10 carbon atoms.

6. A polyurethane according to claim 1, wherein the r of the structural unit (V) of said polycarbonate diol γ is, 9.

7. An elastic polyurethane according to claim 1, wherein said polyurethane is substantially composed of repeating units of:

(x) divalent group derived from said polymer diol with its terminal hydroxyl groups ends having been removed of the 2 hydrogen atoms;

(y) a group derived from an organic diisocyanate and represented by the formula

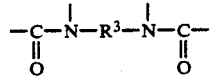

wherein $R^3$ represents a divalent organic group; and (z) a group from a chain extender with its two hydrogen atoms reactable with an isocyanate having been removed; in a molar ratio of (y)/[(x)+(z)] of 0.9 to 1.2.

8. An elastic polyurethane according to claim 7, wherein said molar ratio (y)/[(x)+(z)] is 0.95 to 1.15.

9. An elastic polyurethane according to claim 7, wherein said group (y) derived from an organic diisocyanate is

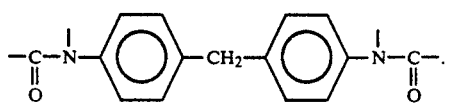

10. An elastic polyurethane according to claim 7, wherein said group (z) from a chain extender with its two hydrogen atoms reactable with an isocyanate having been removed is either —O—CH$_2$—CH$_2$—CH—CH$_2$—O— or

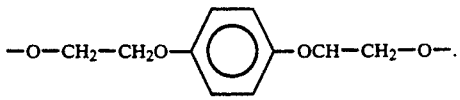

11. An elastic fiber formed of a polyurethane according to claim 1.

12. An elastic fiber formed of a polyurethane according to claim 7.

13. An elastic polyurethane according to claim 1, wherein said polyurethane is derived from a polyester polycarbonate diol α or a mixture comprising a polyester polycarbonate diol α and a mixed polymer diol δ.

* * * * *

UNITED STATES PATENT AND TRADEMARK OFFICE
CERTIFICATE OF CORRECTION

PATENT NO. : 5,290,905
DATED : March 1, 1994
INVENTOR(S) : Yukiatsu KOMIYA, et al.

It is certified that error appears in the above-indentified patent and that said Letters Patent is hereby corrected as shown below:

On the title page, Item [30], the 3rd Foreign Application Priority
  Data should read as follows:

--Aug. 8, 1990 [JP]  Japan ............... 2-211137--

Signed and Sealed this

Eleventh Day of October, 1994

Attest:

BRUCE LEHMAN

Attesting Officer          Commissioner of Patents and Trademarks